United States Patent
Chan et al.

(10) Patent No.: US 10,834,017 B2
(45) Date of Patent: Nov. 10, 2020

(54) CLOUD-DRIVEN HYBRID DATA FLOW AND COLLECTION

(71) Applicant: INTERNATIONAL BUSINESS MACHINES CORPORATION, Armonk, NY (US)

(72) Inventors: Yuk L. Chan, Rochester, NY (US); Charles Kichler, Tampa, FL (US); Subbarao Seethamsetty, Orchard Park, NY (US); Mary D. Swift, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 16/186,556

(22) Filed: Nov. 11, 2018

(65) Prior Publication Data

US 2020/0153752 A1    May 14, 2020

(51) Int. Cl.
*H04L 12/923* (2013.01)
*H04L 29/08* (2006.01)
*G06F 16/958* (2019.01)

(52) U.S. Cl.
CPC .......... *H04L 47/762* (2013.01); *G06F 16/958* (2019.01); *H04L 67/10* (2013.01)

(58) Field of Classification Search
CPC ....... G06F 9/45558; G06F 2009/45595; G06F 2009/4557; G06F 2009/45591;
(Continued)

(56) References Cited

U.S. PATENT DOCUMENTS 6,950,850 B1    9/2005  Leff et al.
7,634,755 B2   12/2009  Polozoff
(Continued)

OTHER PUBLICATIONS

A. Davis, J. Parikh, and W. Weihl, "EdgeComputing: Extending Enterprise Applications to the Edge of the Internet", May 2004, Proceedings of the 13th international World Wide Web conference on Alternate track papers & posters, pp. 180-187.
(Continued)

*Primary Examiner* — Ninos Donabed
(74) *Attorney, Agent, or Firm* — Cantor Colburn LLP; Teddi Maranzano

(57) ABSTRACT

Described herein are systems, devices, methods, computer-readable media, techniques, and methodologies for cloud-to-edge data flow migration. More specifically, example embodiments relate to migrating at least a portion of cloud-based data processing functionality from a cloud environment to network edge environment. The functionality can be migrated to anywhere along the network edge. Input data received or generated at a network edge device may be classified according to one or more classification criteria. At least a portion of cloud-based data processing functionality may then be selected for migration to the network edge based at least in part on the classified input data and/or one or more network characteristics. After migration, at least a portion of the input data may be processed by the migrated functionality. The input data processed at the network edge may then be sent to the cloud environment for additional processing by cloud-based data processing functionality.

18 Claims, 8 Drawing Sheets

(58) Field of Classification Search
CPC .... G06F 9/45533; G06F 9/505; G06F 9/5072; G06F 16/24568; H04L 43/08; H04L 43/0876; H04L 43/16; H04L 47/822; H04L 67/10; H04L 47/70; H04L 41/0896; H04L 41/083; H04W 72/0486; H04W 72/0493; G06N 20/00
See application file for complete search history.

(56) References Cited

U.S. PATENT DOCUMENTS

| | | | | |
|---|---|---|---|---|
| 8,532,108 | B2* | 9/2013 | Li | H04L 12/4633 370/392 |
| 8,639,847 | B2 | 1/2014 | Blaszczak et al. | |
| 9,152,411 | B2 | 10/2015 | Livshits et al. | |
| 9,405,555 | B2 | 8/2016 | Livshits et al. | |
| 10,404,616 | B2* | 9/2019 | Miyazawa | G06N 20/10 |
| 10,419,437 | B2* | 9/2019 | Hu | H04L 67/10 |
| 2006/0015849 | A1 | 1/2006 | Polozoff | |
| 2007/0067440 | A1 | 3/2007 | Bhogal et al. | |
| 2011/0075667 | A1* | 3/2011 | Li | H04L 29/12018 370/392 |
| 2011/0075674 | A1* | 3/2011 | Li | H04L 45/54 370/401 |
| 2015/0381453 | A1* | 12/2015 | Skjolsvold | H04L 43/0876 709/224 |
| 2016/0173636 | A1* | 6/2016 | Wang | H04L 67/2842 709/213 |
| 2016/0181974 | A1* | 6/2016 | Groene | H02S 50/10 324/72 |
| 2016/0352632 | A1* | 12/2016 | Nedeltchev | H04L 12/4633 |
| 2017/0060574 | A1* | 3/2017 | Malladi | G06F 9/542 |
| 2017/0142007 | A1* | 5/2017 | Nedeltchev | H04L 45/50 |
| 2018/0109959 | A1* | 4/2018 | Larsson | H04W 16/18 |
| 2018/0124158 | A1* | 5/2018 | Amento | H04L 41/0806 |
| 2018/0191550 | A1* | 7/2018 | Vempati | H04L 29/08594 |
| 2018/0262413 | A1* | 9/2018 | Sureka | H04L 43/0876 |
| 2018/0263039 | A1* | 9/2018 | Fang | H04L 41/083 |
| 2018/0300124 | A1* | 10/2018 | Malladi | H04L 12/2823 |
| 2018/0332117 | A1* | 11/2018 | Street | G06F 16/27 |
| 2019/0007410 | A1* | 1/2019 | Hu | H04L 47/70 |
| 2019/0132197 | A1* | 5/2019 | Saxena | H04L 41/0803 |
| 2019/0208006 | A1* | 7/2019 | Chen | H04L 67/1002 |
| 2019/0220321 | A1* | 7/2019 | Yang | G06F 9/5038 |
| 2019/0220967 | A1* | 7/2019 | Bhatt | G06K 9/6218 |
| 2019/0228326 | A1* | 7/2019 | Guim Bernat | G06N 3/0454 |
| 2019/0303112 | A1* | 10/2019 | Rajiv | G06F 8/60 |
| 2019/0319868 | A1* | 10/2019 | Svennebring | H04L 41/147 |
| 2019/0324797 | A1* | 10/2019 | Miao | G06F 9/5027 |
| 2019/0369984 | A1* | 12/2019 | Malladi | H04L 29/08 |
| 2020/0008044 | A1* | 1/2020 | Poornachandran | H04L 67/28 |
| 2020/0089481 | A1* | 3/2020 | Asanghanwa | H04L 9/0866 |

OTHER PUBLICATIONS

B. Livshits and E. Kiciman, "Doloto: Code Splitting for Network-Bound Web 2.0 Applications," SIGSOFT 2008/FSE-16, Nov. 9-15, Atlanta, Georgia, USA, 11 pages.

* cited by examiner

CLOUD-DRIVEN HYBRID DATA FLOW AND COLLECTION

BACKGROUND

The present invention relates generally to data flow in a network, and more particularly, to migration of at least a portion of a data processing flow from a cloud computing environment to a network edge environment.

Executing application functionality or other forms of data processing functionality in a cloud environment has enabled the processing of large amounts of data that client devices may not have the processing resources to handle. However, data sent to a cloud environment for processing can become very high in volume such that data transmission to and from the cloud environment can become a bottleneck for real-time data processing.

SUMMARY

In one or more example embodiments, a method for cloud-to-edge data flow migration is disclosed. The method includes receiving input data and classifying the input data based at least in part on one or more classification criteria to obtain classified input data. The method further includes determining a first portion of cloud-based data processing functionality to migrate from a cloud environment that includes one or more cloud computers to a network edge that includes one or more devices along a network path based at least in part on at least one of: i) the classified input data, ii) one or more network characteristics, or iii) one or more device characteristics in the cloud environment or along the network path, and migrating the first portion of the cloud-based data processing functionality to obtain migrated data processing functionality at the network edge. The method then includes processing, at the network edge, at least a subset of the input data using the migrated data processing functionality.

In one or more other example embodiments, a system for cloud-to-edge data flow migration is disclosed. The system includes one or more cloud computers residing at a cloud environment, one or more network edge devices residing at a network edge along a network path, at least one memory storing computer-executable instructions, and at least one processor configured to access the at least one memory and execute the computer-executable instructions to perform a set of operations. The operations include receiving input data and classifying the input data based at least in part on one or more classification criteria to obtain classified input data. The operations further include determining a first portion of cloud-based data processing functionality to migrate from one or more cloud computers to a network edge based at least in part on at least one of: i) the classified input data, ii) one or more network characteristics, or iii) one or more device characteristics in the cloud environment or along the network path, and migrating the first portion of the cloud-based data processing functionality to obtain migrated data processing functionality at the network edge. The operations then include processing, at the network edge, at least a subset of the input data using the migrated data processing functionality.

In one or more other example embodiments, a computer program product for cloud-to-edge data flow migration is disclosed. The computer program product includes a non-transitory storage medium readable by a processing circuit, the storage medium storing instructions executable by the processing circuit to cause a method to be performed. The method includes receiving input data and classifying the input data based at least in part on one or more classification criteria to obtain classified input data. The method further includes determining a first portion of cloud-based data processing functionality to migrate from a cloud environment that includes one or more cloud computers to a network edge that includes one or more devices along a network path based at least in part on at least one of: i) the classified input data, ii) one or more network characteristics, or iii) one or more device characteristics in the cloud environment or along the network path, and migrating the first portion of the cloud-based data processing functionality to obtain migrated data processing functionality at the network edge. The method then includes processing, at the network edge, at least a subset of the input data using the migrated data processing functionality.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
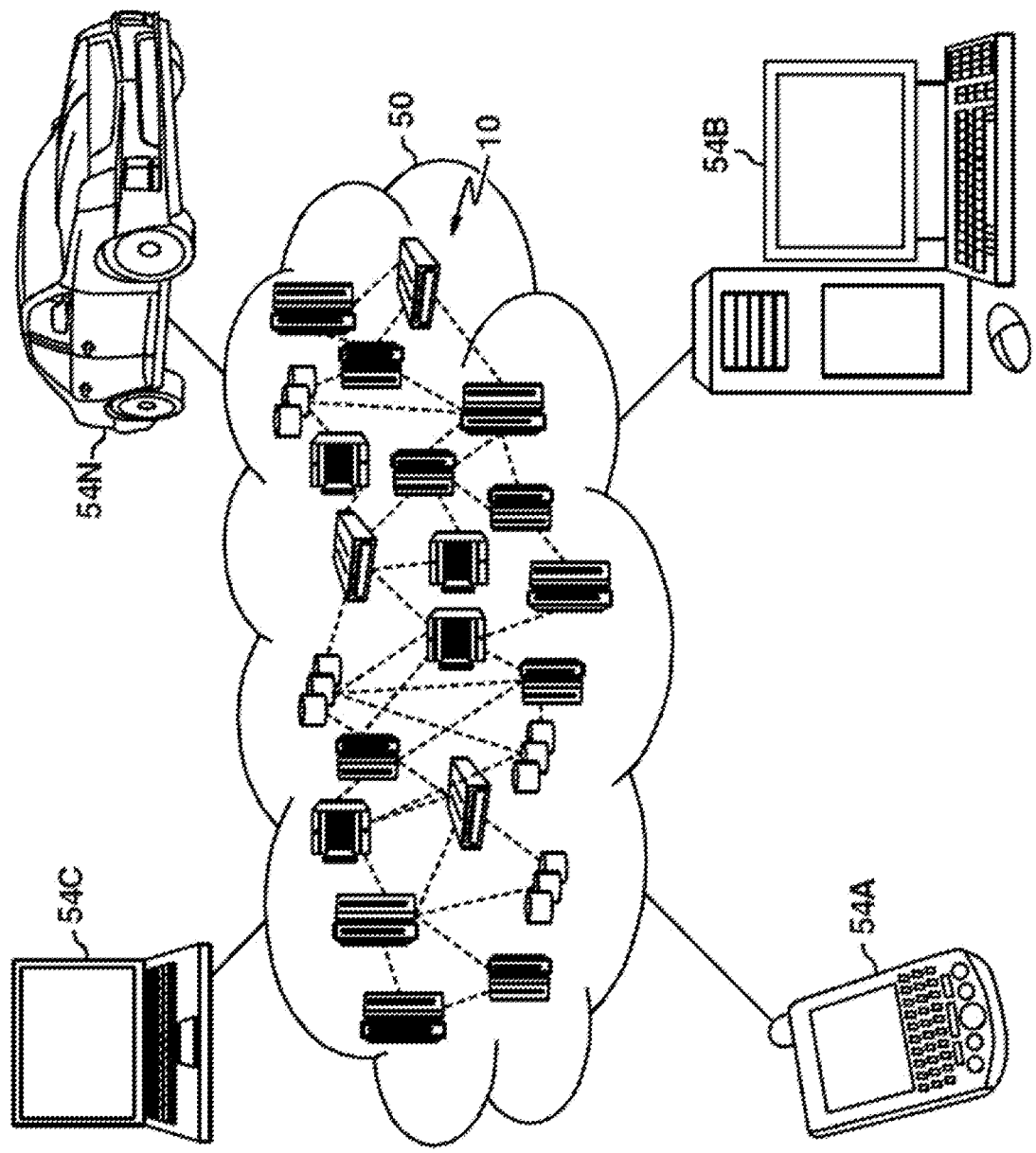
FIG. 1 depicts a cloud computing environment in accordance with one or more example embodiments of the disclosure.

Example embodiments relate to, among other things, systems, devices, methods, computer-readable media, techniques, and methodologies for cloud-to-edge data flow migration. More specifically, example embodiments relate to migrating at least a portion of cloud-based data processing functionality from a cloud environment to a network edge environment. The functionality can be migrated to anywhere along the network edge including any number or type of network edge devices. In example embodiments, input data received or generated at a network edge device may be classified according to one or more classification criteria. At least a portion of cloud-based data processing functionality may then be selected for migration to the network edge based at least in part on the classified input data and/or one or more network characteristics. The selected at least a portion of the cloud-based data processing functionality may then be migrated to the network edge and at least a portion of the input data may be processed by executing, at one or more network edge devices, the migrated functionality on the selected portion of the input data. More specifically, the migrated functionality may be deployed and executed at one or more network edge devices using a container. The container may contain the migrated data flow logic and executable code and may perform associated functions as if they were being performed in the cloud environment. Input data processed by the migrated functionality may be sent to the cloud environment for additional processing by cloud-based data processing functionality that continues to reside at one or more cloud computers in the cloud environment.

In example embodiments, the classification criteria, the network characteristics, and/or network edge device or cloud device characteristics may be used to determine which cloud-based functionality to migrate to the network edge as well as which portion of the input data to select for processing using the migrated functionality. In example embodiments, the classification criteria used to classify the input data may include a size/amount of the input data, a need for real-time processing of the input data, and so forth. For instance, in example embodiments, if a determination is made that the amount of the input data exceeds a threshold value (e.g., a threshold amount of data), this may trigger migration of certain cloud-based functionality to the network edge and selection of some portion of the input data for processing at the network edge using the migrated functionality. In this manner, the amount of data sent to the cloud environment for additional processing may be reduced. In certain example embodiments, the entire raw input data may also be sent (potentially compressed and in batch) to the cloud environment in parallel with the processing of some portion of the input data at the network edge, and the entire raw input data may be processed in the cloud environment by cloud-based functionality that may or may not include functionality equivalent to that which was migrated to the network edge.

In example embodiments, classifying the input data according to the classification criteria may include evaluating whether the any portion of the input data requires real-time processing. For instance, input data that includes vehicle safety or road condition data may need to be processed in real-time in order to provide timely safety/warning notifications to vehicle operators. As another non-limiting example, input data relating to operational status/condition of an airplane engine may require at least some real-time processing in order to provide timely engine status monitoring analysis to an end-user. It should be appreciated that the above examples of scenarios in which real-time data processing may be needed are merely illustrative and not exhaustive.

In such example embodiments, a first portion of the input data may form part of a real-time data flow according to which the first portion of the input data is processed using functionality migrated to the edge (and potentially further processed using functionality that continues to reside in the cloud environment) such that a real-time response can be provided to a target entity. A second portion of the input data may form part of a non-real-time data flow that may optionally also be processed using migrated functionality, but which may not be indicative of requiring a real-time response, and thus, may be compressed and sent in batch to the cloud environment for additional processing. This second portion of the input data may include the entire first portion of the input data, a subset of the first portion of the input data, or an entirely different set of input data from the first portion. The real-time data flow may correspond to input data that requires some form of real-time analytics to be performed. In contrast, input data forming part of the non-real-time data flow may not require immediate analytics, but rather may include data relating to regulatory requirements, asynchronous data, data requiring near-term or long-term analytics, or the like. Splitting the input data into a first portion that is directed to a real-time data flow and a second portion that is directed to a non-real-time data flow may represent a form of a multi-path processing that is performed at the network edge.

In example embodiments, certain cloud-based functionality may be migrated to the network edge to provide load balancing between processing performed in the cloud environment by one or more cloud computers and processing performed at the network edge by one or more network edge devices. For instance, a high level of resource utilization in the cloud environment may trigger migration of some cloud-based functionality to the network edge such that some portion of input data is processed at the network edge using the migrated functionality and then sent to the cloud environment for additional processing. Another portion of the input data may be sent to the cloud environment for processing by cloud-based functionality that may include functionality that is equivalent to the migrated functionality as well as additional cloud-based functionality. In this manner, the processing of the input data can be load-balanced between the cloud environment and the network edge.

In example embodiments, network characteristics(s) such as a network latency may influence whether functionality is migrated from the cloud environment to the network edge. For instance, if the network latency is particularly high (e.g., exceeds a threshold latency), some portion of cloud-based functionality may be migrated to the network edge to allow for at least a portion of the input data to bypass the high network latency and be processed at the network edge using the migrated functionality. The input data processed at the network edge using the migrated functionality in the case of high network latency may be, for example, data that requires real-time analytics. The network edge devices at which the migrated functionality is executed may be more proximal to the data source than cloud computer(s) in the cloud environment, thereby eliminating the processing delay that would occur due to the high latency if the data was sent directly to the cloud environment for processing.

In example embodiments, the processing performed by functionality migrated from the cloud environment to the network edge may include data cleansing, data filtering, data standardization, data transformation, data summarization, data analytics, or any other suitable form of data processing. Further, the type of functionality that is migrated from the cloud environment to the network edge may be context and/or application specific. For instance, functionality that provides short-term analytics of certain data in real-time may be migrated to the network edge, while other functionality that provides more long-term analytics may remain in the cloud environment.

In example embodiments, the cloud-based data processing functionality may include data analytics including data filtering, data transformation on the filtered data, analysis of the transformed data with another source of data within a cloud database, storage of the original data for auditing purposes, and storage of the analysis result for immediate use. If there is a large amount of data to transfer to the cloud and/or network latency due to network bandwidth is a concern, some cloud-based functionality can be migrated to a network edge, or more specifically, to one or more devices anywhere along the network path. For instance, the filtering functionality can be migrated to the network edge.

In example embodiments, there may be a continued need to store the raw, non-filtered data, in which case, a new function can be generated and executed on one or more edge devices. In example embodiments, this new function partitions the raw data, compresses each partition, and sends the compressed partitions to the cloud environment whenever the network bandwidth utilization is low. In addition, in example embodiments, a new function can be generated and executed in the cloud environment to decompress the compressed partitions, merge the decompressed partitions over time, and store the merged result in a cloud database.

In example embodiments, because the analyzing of transformed data requires other source(s) of data within the cloud database, this functionality remains in the cloud and is not migrated to the network edge. Functionality for transforming the filtered data can be migrated to an edge device, can remain in the cloud, or can execute partially in the cloud and partially at the network edge. Further, in example embodiments, if it is determined that an edge device has available computing resources to perform more tasks but cannot handle the transformation of all input data, a function can be generated and executed at the edge device that transforms, for example, 30% of the filtered data, leaving 70% of the filtered data to be transformed within the cloud environment.

In example embodiments, the one or more devices at network edge to which cloud-based functionality is migrated can include, without limitation, a dash cam on an automobile, a mobile phone, a network router, a computing device with firewall capability, or any other devices along the network path. For instance, in example embodiments, a dash cam can capture various sensor data including, without limitation, video data; a current GPS location; a temperature measurement; a velocity/acceleration of the dash cam; and so forth. In example embodiments, cloud-based functionality can be migrated to and distributed among multiple devices along the network path based on a dependency relationship between different functions of the migrated functionality and/or based on the type of network edge device best suited to execute a given migrated function.

As a non-limiting example, an analysis can be performed to identify an environmental condition such as a potentially icy road, a road hazard such as fallen tree or a car accident, or the like. If this analysis is performed entirely within the cloud environment, it may include receiving all sensor data at the cloud environment and performing a first function in the cloud to filter the video data based, for example, on the speed of movement of the dash cams that captured the video data in order to reduce the number of frames to be analyzed. The analysis may further include performing a second function in the cloud to analyze video captured by dash cams from multiple vehicles that are in close proximity to one another in order to assess the potential of a hazardous road condition.

In example embodiments, the first function for filtering the video data can be migrated from the cloud to each of multiple dash cam devices such that each dash cam can perform the filtering operation itself. Further, in example embodiments, the second function can be migrated from the cloud to a router located along the highway. Thus, in example embodiments, different cloud functions (e.g., the first function and the second function) can be migrated to and distributed among different devices along the network path based on the dependency relationship of the functions; the type of network edge device; the type of data to be processed; and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
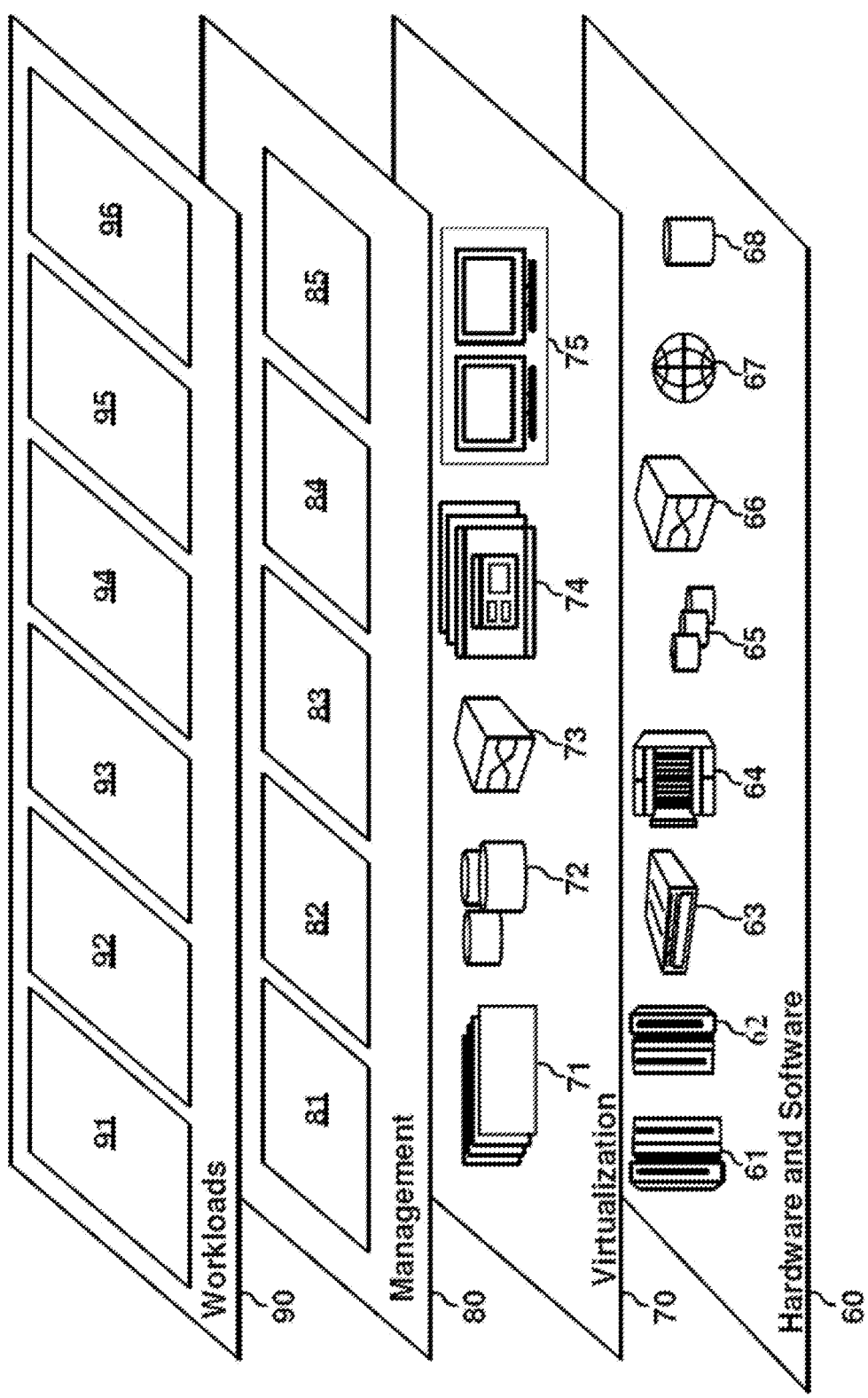
FIG. 2 depicts abstraction model layers in accordance with one or more example embodiments of the disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud-to-edge data flow migration 96.

Figure 3:
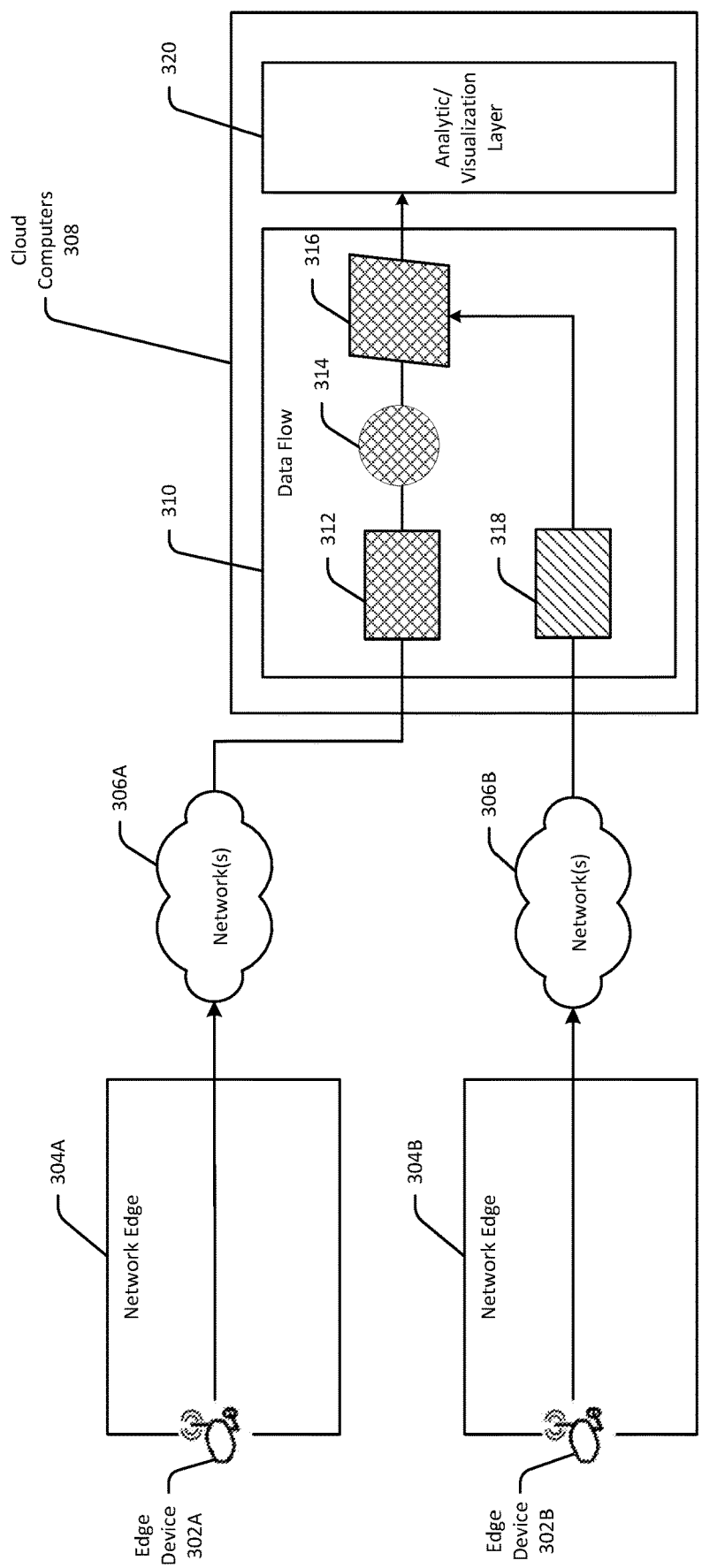
FIG. 3 is a schematic diagram illustrating cloud-based data processing functionality.

FIG. 3 is a schematic diagram illustrating cloud-based data processing functionality. FIG. 3 depicts a first network edge 304A and a second network edge 304B. The first network edge 304A may include any number of network edge devices such as network edge device 302A. Similarly, the second network edge 304B may include any number of network edges devices such as network edge device 302B. Each of the first network edge device 302A and the second network edge device 302B may be a device that captures/collects input data and sends the input data through various other network edge devices of a respective network edge 304A, 304B, through a respective one or more networks 306A, 306B, and ultimately to one or more cloud computers 308 for processing using cloud-based functionality 310. The input data captured by the network edge devices 302A, 302B may be, for example, data captured by sensors of the devices that relates to operational parameters or conditions of a machine (e.g., a vehicle, an engine, etc.). The data collected by the network edge devices 302A, 302B may be a large amount of data in the hundreds or thousands of terabytes or more. Each of the network(s) 306A, 306B may include any combination of one or more public or private networks.

The cloud-based functionality may include various modular components of a data flow 312, 314, 316, and 318. The modular components can represent pieces of logic or executable code and can be as granular as a particular function or class definition or can include multiple distinct modules forming part of a single modular component or a continuous piece of code that is dynamically broken into multiple modules. The data received from the network edge device 302 may be processed by a data flow that includes modular components 312, 314, and 316, while the data received from the network edge device 302B may be processed by a data flow that includes the modular component 318 follow by the modular component 316. Each of these processed data flows may then be provided to an analytic/visualization layer 320 for additional processing such as analytics or other feedback that may be provided back to the network edge devices 302A, 302B and/or other devices or users of such devices.

Various illustrative methods according to example embodiments of the invention and corresponding data structures associated therewith will now be described. It should be noted that each operation of the method 700 depicted in FIG. 7 may be performed by one or more of the program modules or the like depicted in FIG. 8, whose operation will be described in more detail later in this disclosure. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 4:
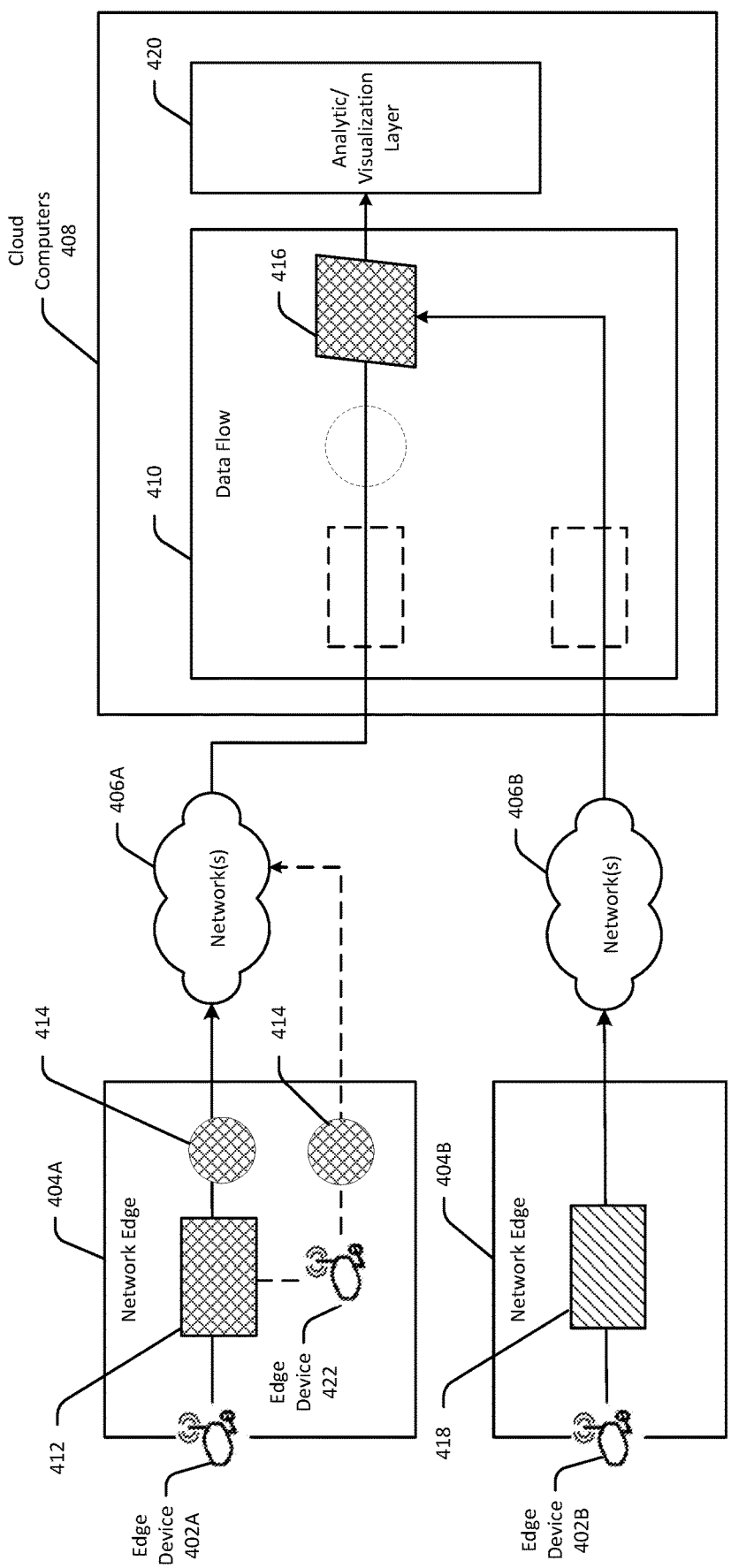
FIG. 4 is a schematic diagram illustrating migration of cloud-based data processing functionality to a network edge in accordance with one or more example embodiments.
Figure 5:
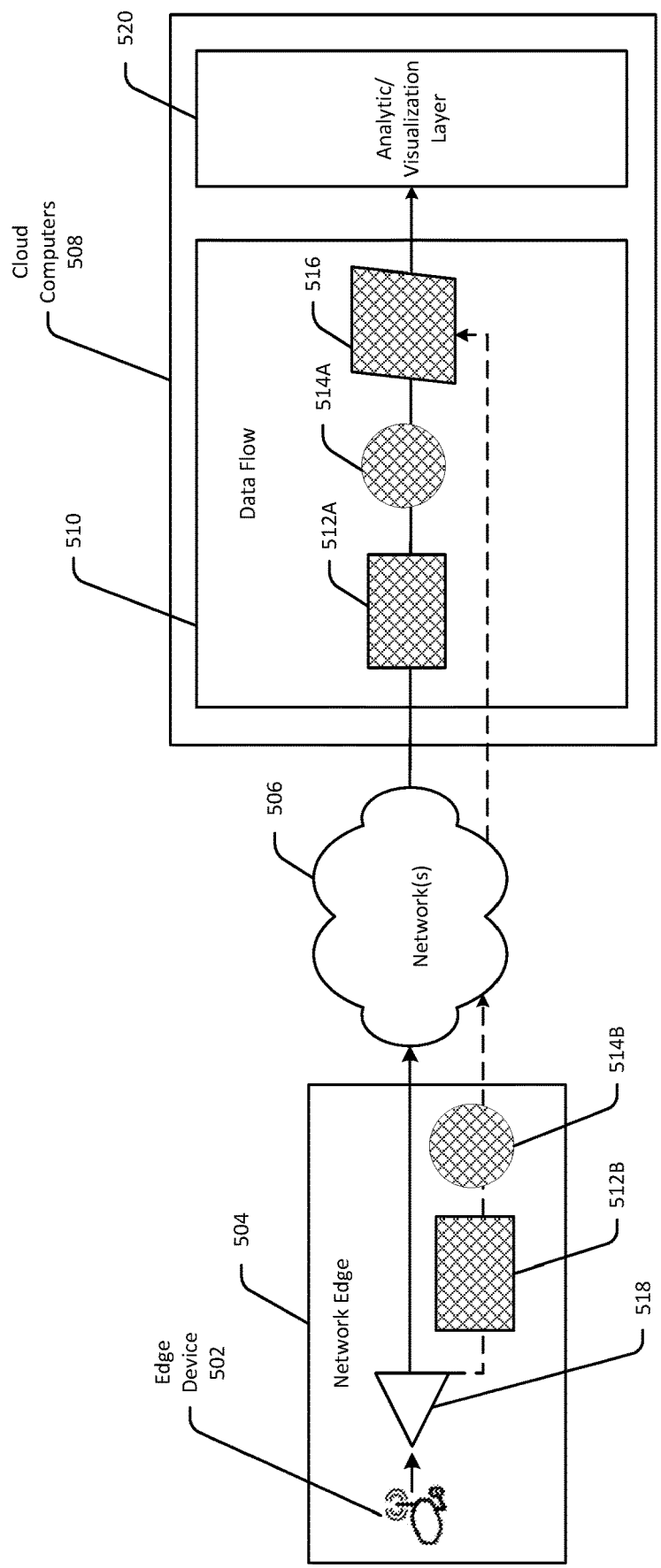
FIG. 5 is a schematic diagram illustrating partitioning of the processing of input data between cloud-based data processing functionality migrated to a network edge and cloud-based data processing functionality residing on one or more cloud computers in accordance with one or more example embodiments.
Figure 6:
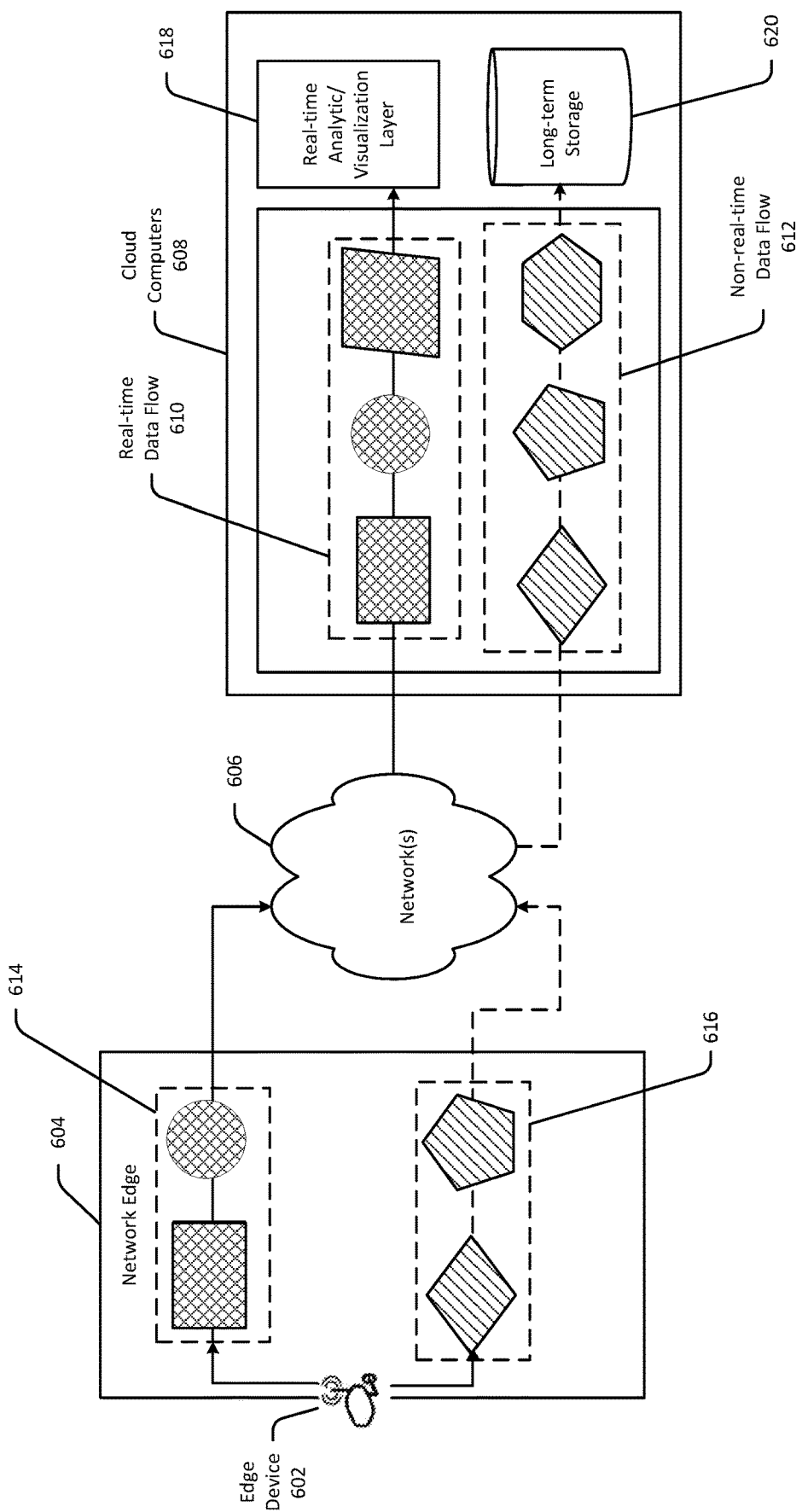
FIG. 6 is a schematic diagram illustrating partitioning of the processing of input data into a real-time data flow and a non-real-time data flow in accordance with one or more example embodiments.
Figure 7:
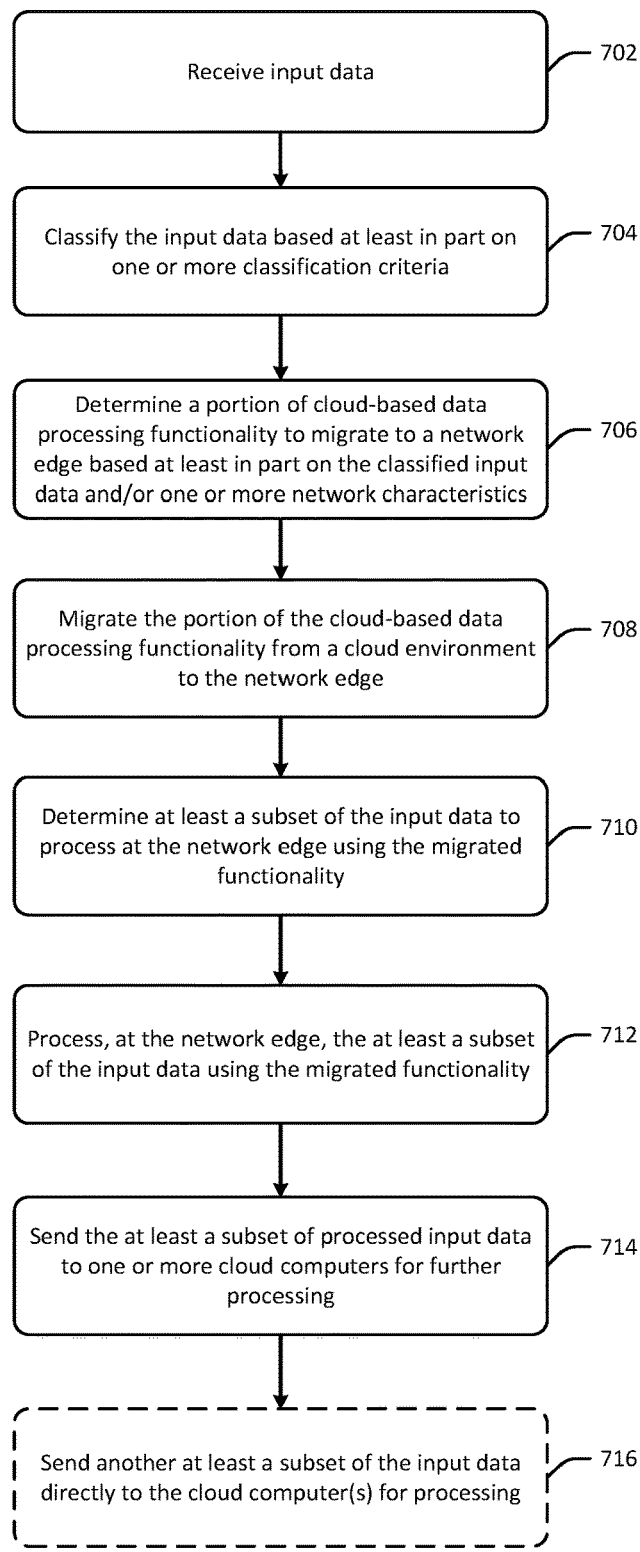
FIG. 7 is a process flow diagram of an illustrative method for migrating data processing functionality from a cloud environment to a network edge environment and processing at least a portion of input data using the migrated functionality in accordance with one or more example embodiments.

FIG. 4 is a schematic diagram illustrating migration of cloud-based data processing functionality to a network edge in accordance with one or more example embodiments. FIG. 5 is a schematic diagram illustrating partitioning of the processing of input data between cloud-based data processing functionality migrated to a network edge and cloud-based data processing functionality residing on one or more cloud computers in accordance with one or more example embodiments. FIG. 6 is a schematic diagram illustrating partitioning of the processing of input data into a real-time data flow and a non-real-time data flow in accordance with one or more example embodiments. FIG. 7 is a process flow diagram of an illustrative method 700 for migrating data processing functionality from a cloud environment to a network edge environment and processing at least a portion of input data using the migrated functionality in accordance with one or more example embodiments. FIG. 7 will be described in conjunction with FIGS. 3-6 hereinafter.

At block 702 of the method 700, respective input data may be received/generated at a first network edge device 402A forming part of a first network edge 404A and a second network edge device 402B forming part of a second network edge 404B. The first network edge 404A may include any number of network edge devices including the network edge device 402A. Similarly, the second network edge 404B may include any number of network edges devices including network edge device 402B. Each of the first network edge device 404A and the second network edge device 404B may be a device that captures/collects input data and sends at least a portion of the input data through various other network edge devices of a respective network edge 404A, 404B, through a respective one or more networks 406A, 406B, and ultimately to one or more cloud computers 408.

The input data captured by the network edge devices 402A, 402B may be, for example, data captured by sensors of the devices that relates to operational parameters or conditions of a machine (e.g., a vehicle, an engine, etc.). The data collected by the network edge devices 402A, 402B may be a large amount of data in the hundreds or thousands of terabytes or more. Each of the network(s) 406A, 406B may include any combination of one or more public or private networks. While the network edges 404A, 404B are shown as being distinct from the respective network(s) 406A, 406B, it should be appreciated that, in example embodiments, the network edges 406A, 406B may be contained in and form part of the respective network(s) 406A, 406B. In example embodiments, FIG. 4 may represent a network architecture that corresponds to the network architecture depicted in FIG. 3, but in which at least a portion of cloud-based functionality 410 shown as residing on one or more cloud computers 408 in the cloud environment is migrated to the network edges 404A, 404B.

Referring again to FIG. 7, at block 704 of the method 700, computer-executable instructions of one or more input data classification modules (FIG. 8) may be executed to classify the input data based at least in part on one or more classification criteria. The classification criteria may include any suitable criteria including, but not limited to, the size/amount of input data; the extent to which input data needs to be processed in real-time; and so forth. As previously noted and as will be described in more detail later in this disclosure, the classification criteria and/or various network characteristic(s) may be evaluated to determine whether to migrate some portion of the cloud-based functionality 410 residing on at least one of the cloud computer(s) 408 to one or more network edge devices of the network edge 404A and/or the network edge 404B, and if the determination to migrate is an affirmative one, which portion(s) of the functionality 410 to migrate and which portion(s) of the input data to process at the network edge 404A and/or the network edge 404B using the migrated functionality. In example embodiments, the input data classification module(s) may reside at a network edge (e.g., network edge 404A) and may be executed on a network edge device (e.g., the edge device 402A that initially generates/captures the input data). In other example embodiments, the input data classification module(s) may reside on at least one of the cloud computer(s) 408 such that the input data (or some portion thereof) is sent to the cloud environment for classification.

At block 706 of the method 700, computer-executable instructions of one or more migration determination modules (FIG. 7) may be executed to determine at least a portion of the cloud-based data processing functionality 410 to migrate to the network edge 404A based at least in part on the classified input data and/or one or more network characteristics. Similarly, the migration determination modules (FIG. 7) may determine at least a portion of the cloud-based data processing functionality 410 to migrate to the network edge 404B based at least in part on the classified input data and/or the network characteristic(s). Then, upon identifying the cloud-based functionality 410 to migrate to the respective network edges 404A, 404B, computer-executable instructions of one or more migration modules (FIG. 7) may be executed at block 708 of the method 700 to migrate the selected cloud-based functionality 410 to an appropriate network edge 404A and/or network edge 404B.

For instance, as depicted in FIG. 4, the cloud-based functionality 410 may include various modular components of various data flows. In particular, in the example embodiment depicted in FIG. 4, a data flow for processing input data received from the network edge device 402A may include modular components 412, 414, and 416, while a data flow for processing input data received from the network edge device 402B may include modular components 418 and 416. In example embodiments, a data flow may also specify the order in which the modular components are executed on the input data. For instance, the data flow corresponding to the input data received from the network edge device 402A may include first processing the input data using the modular component 412, then processing the result of the processing of component 412 using the modular component 414, and then processing the result of the processing of component 414 using the modular component 416. Similarly, the data flow corresponding to the input data received from the network edge device 402B may include first processing the input data using the modular component 418 and then processing the result of the processing of component 418 using the modular component 416. The modular components 412, 414, 416, and 418 can represent pieces of logic or executable code and can be as granular as a particular function or class definition or can include multiple distinct modules forming part of a single modular component.

In the example embodiment depicted in FIG. 4, a portion of the cloud-based functionality 410 that includes modular components 412 and 414 may be migrated to the network edge 404A, and a portion of the cloud-based functionality 410 that includes modular component 418 may be migrated to the network edge 404B. The cloud-based functionality 410 can be migrated to anywhere along a network edge, that is, to any one or more network edge devices in a network edge. More specifically, the migrated functionality may be deployed and executed at one or more network edge devices using a container. The container may contain the migrated data flow logic and executable code and may perform associated functions as if they were being performed in the cloud environment.

Referring again to FIG. 7, at block 710 of the method 700, one or more network edge devices to which cloud-based functionality has been migrated may determine at least a subset of the input data to process using the migrated functionality. Then, at block 712 of the method 700, the at least a subset of the input data determined at block 710 may be processed using the corresponding migrated functionality. At block 714 of the method 700, the at least a subset of the input data processed by the migrated functionality may be sent to the cloud environment (e.g., at least one of the cloud computer(s) 408) for additional processing by non-migrated cloud-based data processing functionality 410 residing in the cloud environment. Further, optionally, at block 716 of the method 700, another at least a subset of the input data may bypass any processing at the network edge using migrated functionality and may be sent directly (e.g., via a respective network(s) 406A, 406B) to the cloud computer(s) 408 for processing by data processing functionality residing in the cloud environment.

In alternative example embodiments, a first function represented, for example, by the modular component 412 is migrated to the network edge 404A for execution at the edge device 402A. The first function may be, for example, filtering operations to filter video data captured by the edge device 402A. In example embodiments, the first function may be migrated to multiple such edge devices (e.g., multiple automobile dash cam devices) so that each dash cam can perform the filtering operation itself locally. Further, in example embodiments, a second function represented by the modular component 414 can alternatively be migrated from the cloud environment to another network edge device 422 (e.g., a router located along the highway) for execution locally on the device 422. The second function may, for example, constitute analysis of the filtered video data captured by dash cams from multiple vehicles that are in close proximity to one another in order to assess the potential of a hazardous road condition. Thus, in example embodiments, different cloud functions (e.g., the first function and the second function) can be migrated to and distributed among different devices along the network path (e.g., the edge device 402A and the edge device 422) based on the dependency relationship of the functions; the type of network edge device; the type of data to be processed; and so forth.

Referring again to the cloud environment, after additional processing by the non-migrated cloud-based data processing functionality, the processed data may be sent to an analytic/visualization layer 420 for further analytics and/or visualization processing to present results of the analysis back to a network edge device. For example, the results of the analytics and/or visualization processing performed by the layer 420 may be presented in the form of a message or notification to an end-user. As a non-limiting example, the input data may include operational data from vehicles, where the data is potentially indicative of dangerous road conditions. The additional processing performed by the cloud-based data processing functionality and/or the layer 420 (which may include receiving third-party data such as a weather data) may reveal that the operational vehicular data is indicative of unsafe weather conditions, or in the alternative, is not indicative of unsafe weather conditions, but rather is indicative of an accident; vehicular issues potentially indicative of a need for safety recall; or some other factor. A notification indicative of the determined cause for the operational data that is observed may then be sent to a network edge and presented to an end-user via, for example, a vehicle display or a roadside display.

In example embodiments, the classification criteria, the network characteristics, and/or network edge device or cloud device characteristics may be used to determine not only which cloud-based functionality to migrate to a network edge but to determine which portion of the input data to select for processing using the migrated functionality as well. For instance, in example embodiments, if classification of the input data at block 704 indicates that the amount of the input data exceeds a threshold value (e.g., a threshold amount of data), this may trigger migration of certain cloud-based functionality to the network edge and selection of some portion of the input data for processing at the network edge using the migrated functionality. In this manner, the amount of data sent to the cloud environment for processing by additional cloud-based data processing functionality may be reduced.

More specifically, referring to the example embodiment depicted in FIG. 4, in response to a determination that the input data generated/collected by the network edge device 402A is more than a threshold size, cloud-based data processing functionality embodied in the modular components 412 and 414 may be migrated to the network edge 404A, and at least a portion of the input data from the edge device 402A may be processed by the migrated functionality embodied in the components 412 and 414. Similarly, in response to a determination that the input data generated/collected by the network edge device 402B is more than a threshold size, cloud-based data processing functionality embodied in the modular component 418 may be migrated to the network edge 404B, and at least a portion of the input data from the edge device 402B may be processed by the migrated functionality embodied in the component 418. The input data processed at the network edge 404A by the functionality migrated to the network edge 404A may then be sent over the network(s) 406A to at least one of the cloud computer(s) 408 for additional processing by cloud-based functionality that continues to reside in the cloud environment and that is embodied in the modular component 416 in the example embodiment of FIG. 4. Similarly, the input data processed at the network edge 404B by the functionality migrated to the network edge 404B may then be sent over the network(s) 406B to at least one of the cloud computer(s) 408 for additional processing by the cloud-based functionality embodied in the modular component 416 in the example embodiment of FIG. 4.

In example embodiments, network characteristics(s) such as a network latency may influence whether/which functionality is migrated from the cloud environment to the network edge. For instance, if the network latency is particularly high (e.g., exceeds a threshold latency), the portion of the cloud-based functionality represented by the modular components 412 and 414 may be migrated to the network edge 404A and the portion of the cloud-based functionality represented by the modular component 418 may be migrated to the network edge 404B to allow for at least a portion of the respective input data from edge devices 402A, 402B to bypass the high network latency and be processed at the respective network edge 404A, 404B using the respective migrated functionality. The input data processed at a network edge using migrated functionality in the case of high network latency may be, for example, data that requires real-time analytics. The network edge device(s) at which the migrated functionality is executed may be more proximal to the data source than the cloud computer(s) 408, thereby eliminating the processing delay that would occur due to the high latency if the data was sent directly to the cloud environment for processing.

FIG. 5 depicts an example embodiment in which certain cloud-based functionality is migrated to a network edge to provide load balancing between processing performed in a cloud environment and processing performed at the network edge by one or more network edge devices. For instance, a high degree of resource utilization in the cloud environment (e.g., resource utilization above a threshold value) may trigger migration of some cloud-based functionality to the network edge such that some portion of input data is processed at the network edge using the migrated functionality.

Referring to the example embodiment of FIG. 5, a network edge 504 is depicted that may include multiple network edge devices including network edge device 502 that may generate/collect input data. Cloud-based functionality 510 residing at one or more cloud computers 508 may include modular components 512A, 514A, and 516. In addition, an analytic/visualization layer 520 may reside in the cloud environment as well. In example embodiments, the cloud-based functionality represented by the modular components 512A and 514A are migrated to the network edge 504. The migrated functionality is represented by the modular components 512B and 514B.

In example embodiments, a component 518 may be inserted at the network edge 504 such that the component is executable on one or more network edge devices in the network edge 504. The component 518 may be additional logic that is inserted at the network edge 504 and that is not originally present in the migrated cloud-based functionality. The component 518 may direct a first portion of the input data from the edge device 502 for processing using the migrated functionality represented by components 512B and 514B. The first portion of the input data processed by the migrated functionality may then be sent, at block 714 of the method 700, over one or more networks 506 to the cloud computer(s) 508 for additional processing by cloud-based functionality represented by the component 516. In example embodiments, a second portion of the input data may bypass any processing at the network edge 504 and may be sent, at block 716 of the method 700, to the cloud computer(s) 508 for processing by cloud-based functionality that may include functionality that is equivalent to the migrated functionality (represented by modular components 512A and 514A) as well as the additional cloud-based functionality represented by the component 516. In this manner, the processing of the input data can be load-balanced between the cloud environment and the network edge 504.

In certain example embodiments, the entire raw input data from the edge device 502 may be sent (potentially compressed and in batch) to the cloud environment in parallel with the processing of the first portion of the input data at the network edge 504 using the migrated functionality. The entire raw input data may be processed at the cloud computer(s) 508 by cloud-based functionality that includes functionality equivalent to that which was migrated to the network edge 504 (embodied in modular components 512A and 514A) as well as additional cloud-based functionality (embodied in the modular component 516). Alternatively, the entire raw data may be processed in the cloud environment by cloud-based functionality that does not include functionality equivalent to the migrated functionality. While the example embodiment of FIG. 5 is described in connection with load balancing between the cloud environment and the network edge 504, it should be appreciated that this example embodiment may also be applicable to scenarios in which the amount of input data exceeds a threshold value; scenarios in which the network latency exceeds a threshold latency; and/or scenarios in which some portion of the input data requires real-time processing.

In example embodiments, functionality represented by the modular component 512B may include filtering of the input data and functionality represented by the modular component 514B may include transformation of the filtered data. In example embodiments, because functionality to analyze the transformed data may require other source(s) of data within the cloud environment, this functionality may continue to reside at the cloud computers 508 and may not be migrated to the network edge 504. In example embodiments, functionality for transforming the filtered data (represented by the modular component 512B) can be migrated to the network edge 504, can remain in the cloud, or can execute partially in the cloud and partially at the network edge 504. Further, in example embodiments, if it is determined that an edge device (e.g., the edge device 502) has available computing resources to perform more tasks but cannot handle the transformation of all input data, a function (not shown) can be generated and executed at the edge device to transform a portion of the filtered data, leaving the remaining portion of the filtered data to be transformed within the cloud environment.

As previously noted, FIG. 6 is a schematic diagram illustrating partitioning of the processing of input data into a real-time data flow and a non-real-time data flow in accordance with one or more example embodiments. In example embodiments, classifying the input data according to the classification criteria at block 704 of the method 700 may include evaluating whether any portion of the input data requires real-time processing. For instance, input data that includes vehicle safety or road condition data may need to be processed in real-time in order to provide timely safety notifications to vehicle operators. In such example embodiments, a first portion of input data generated/collected by a network edge device 602 may form part of a real-time data flow 610 according to which a first portion of the input data is processed using functionality 614 migrated to a network edge 604 (and potentially further processed using functionality that continues to reside in a cloud environment that includes one or more cloud computers 608) such that a real-time response can be provided to a target entity. A second portion of the input data may form of a non-real-time data flow 612 that may, optionally, also be processed using some migrated functionality 616, but which may not be indicative of requiring a real-time response, and thus, may be compressed and sent in batch (or sent in raw form) via one or more networks 606 to the cloud environment for processing.

The real-time data flow 610 may be sent to a real-time analytic/visualization layer 618 for further analytics that may be needed prior to providing a real-time response to one or more users. The real-time data flow 610 may correspond to input data that requires some form of real-time analytics to be performed. In contrast, input data forming part of the non-real-time data flow 612 may not require immediate analytics, but rather may include data relating to regulatory requirements, asynchronous data, data requiring near-term or long-term analytics, or the like. The results of processing of the non-real-time data flow 612 may be stored in long-term storage 620 for future use/analytics. Splitting the input data into a first portion that is directed to the real-time data flow 610 and a second portion that is directed to the non-real-time data flow 612 may represent a form of a multi-path processing that is performed at the network edge 604.

In certain example embodiments, processing of the portion of the input data at the network edge 604 using the migrated functionality 614 as part of the real-time data flow 610 may include filtering the input data to identify data that has changed from previously received input data. In certain example embodiments, only the changed data may be sent to the cloud environment as part of the real-time data flow as a means of data reduction. For instance, only the changed data may be sent in cases of high network latency or in cases where there is a large amount of input data. In addition to the changed data, one or more indicators of the unchanged data may also be sent to the cloud environment to enable the cloud computer(s) 608 to reconstruct the unchanged data. It should be appreciated that similar data reduction techniques and/or other techniques such as data compression techniques may be applied to the input data prior to sending the processed input data to the cloud environment as part of the non-real-time data flow 612.

Example embodiments provide various technical features, technical effects, and improvements to technology. Example embodiments, for example, provide the technical effect of load balancing between processing performed in a cloud environment and processing performed at a network edge. This technical effect is achieved, at least in part, by the technical features of migrating at least a portion of cloud-based processing functionality from a cloud environment to a network edge and inserting logic at the network edge to direct a first portion of input data for processing at the network edge using the migrated functionality (and potentially further processing in the cloud environment) and to direct a second portion of the input data to bypass any processing at the network edge to be processed solely in the cloud environment.

Example embodiments also provide the technical effect of mitigating the impact of transmission delay caused by high latency in transmissions between a network edge and a cloud environment as well as the technical effect of mitigating the impact of the delay associated with transmitting a large amount of data from the network edge to the cloud environment. In particular, in cases of high latency and/or a large amount of input data to transfer, cloud-based functionality can be migrated to the network edge and at least a portion of the input data can be processed at the network edge to improve the processing performance and reduce the impact of the high latency and/or reduce the amount of input data that needs to be sent to the cloud environment for processing. In addition, the technical features of migrating cloud-based functionality to the network edge and processing at least a subset of input data at the network edge using the migrated functionality enables more real-time processing of input data and real-time responses that may not be possible particularly in scenarios of high network latency and/or large amounts of data to transfer to the cloud environment.

Further, example embodiments also provide the technical effect of improved real-time performance at the network edge, which is achieved, at least in part by the technical features of migrating different cloud-based functions to different network edge devices based, for example, on dependency relationships between the different functions, characteristics of the network edge devices, and/or classification of the input data. In addition, example embodiments provide the technical effect of migrating a portion of a particular cloud-based function to the network edge, which is achieved, at least in part, by the technical features of generating and execution of a new function at the network edge that performs the particular cloud-based function on a portion of the input data, leaving the remaining portion for processing at the cloud. The aforementioned technical effects constitute an improvement to technology, particularly an improvement to cloud-based data processing technologies.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 8:
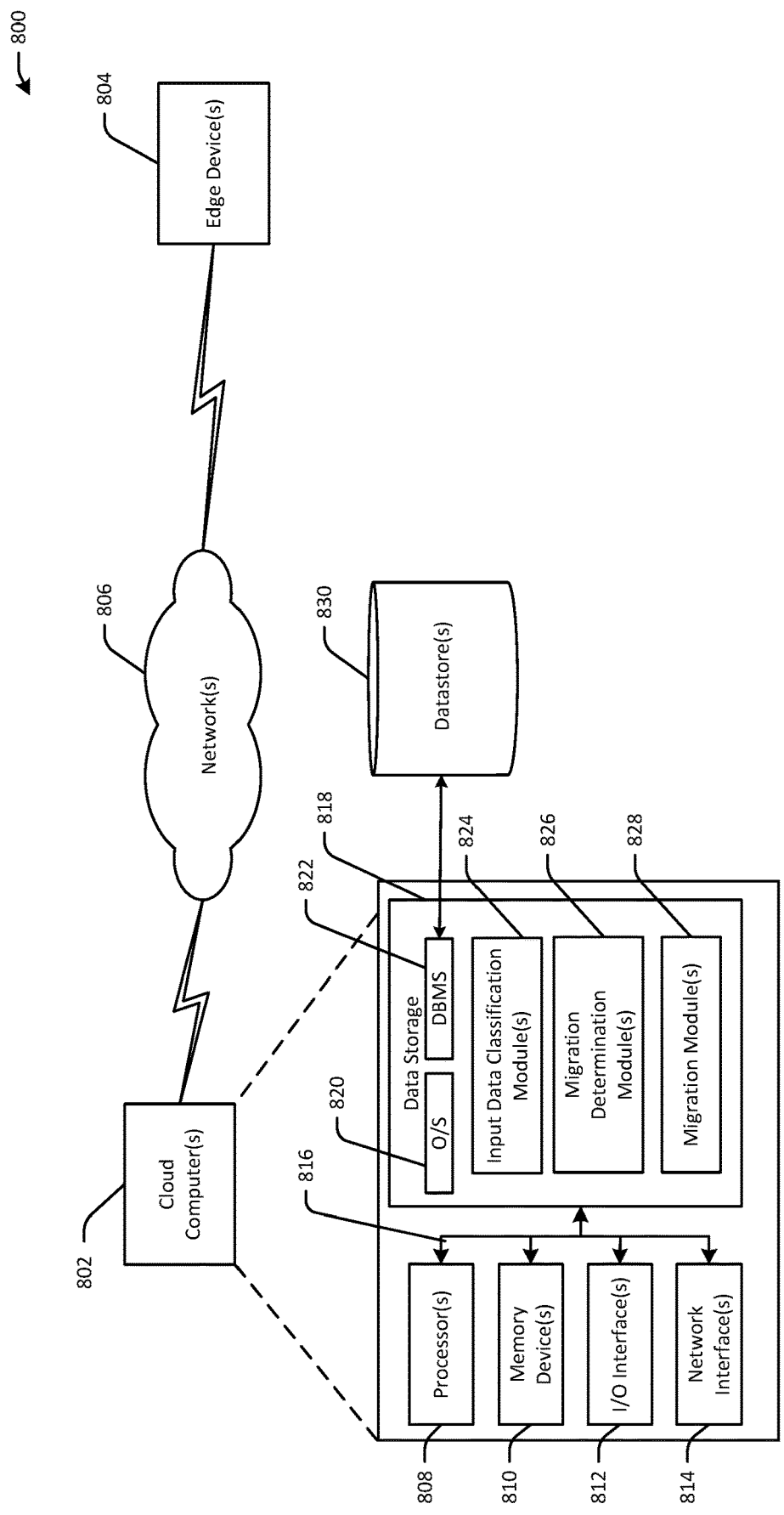
FIG. 8 is a schematic diagram of an illustrative networked architecture configured to implement one or more example embodiments.

FIG. 8 is a schematic diagram of an illustrative networked architecture 800 configured to implement one or more example embodiments of the disclosure. The networked architecture 800 may include one or more cloud computers 802, which may be configured to communicate via one or more networks 806 with one or more network edge devices 804. As previously noted, the network edge device(s) 804 may reside anywhere along the network edge. Thus, the network edge device(s) 804 may include a device that collects data or any intermediate device to which the collected data is sent through the network(s) 806 to ultimately reach the cloud computer(s) 802. The network edge device(s) 804 may include any of the network edge devices previously referenced in this disclosure or any other device residing at any network edge previously referenced in this disclosure. Similarly, the cloud computer(s) 802 may include any of the cloud computers previously referenced in this disclosure. While any particular component of the networked architecture 800 may be described herein in the singular, it should be appreciated that multiple instances of any such component may be provided, and functionality described in connection with a particular component may be distributed across multiple ones of such a component or across multiple components.

The network(s) 806 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 806 may have any suitable communication range associated therewith and may include, for example, global networks (e.g., the Internet), metropolitan area networks (MANs), wide area networks (WANs), local area networks (LANs), or personal area networks (PANs). In addition, the network(s) 806 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the cloud computer 802 may include one or more processors (processor(s)) 808, one or more memory devices 810 (generically referred to herein as memory 810), one or more input/output ("I/O") interface(s) 812, one or more network interfaces 814, and data storage 818. The cloud computer 802 may further include one or more buses 816 that functionally couple various components of the cloud computer 802.

The bus(es) 816 may include at least one of a system bus, a memory bus, an address bus, or a message bus, and may permit the exchange of information (e.g., data (including computer-executable code), signaling, etc.) between various components of the cloud computer 802. The bus(es) 816 may include, without limitation, a memory bus or a memory controller, a peripheral bus, an accelerated graphics port, and so forth. The bus(es) 816 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 810 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 810 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 810 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 818 may include removable storage and/or non-removable storage including, but not limited to, magnetic storage, optical disk storage, and/or tape storage. The data storage 818 may provide non-volatile storage of computer-executable instructions and other data. The memory 810 and the data storage 818, removable and/or non-removable, are examples of computer-readable storage media (CRSM) as that term is used herein.

The data storage 818 may store computer-executable code, instructions, or the like that may be loadable into the memory 810 and executable by the processor(s) 808 to cause the processor(s) 808 to perform or initiate various operations. The data storage 818 may additionally store data that may be copied to memory 810 for use by the processor(s) 808 during the execution of the computer-executable instructions. Moreover, output data generated as a result of execution of the computer-executable instructions by the processor(s) 808 may be stored initially in memory 810 and may ultimately be copied to data storage 818 for non-volatile storage.

More specifically, the data storage 818 may store one or more operating systems (O/S) 820; one or more database management systems (DBMS) 822 configured to access the memory 810 and/or one or more external datastores 830; and one or more program modules, applications, engines, managers, computer-executable code, scripts, or the like such as, for example, one or more input data classification modules 824, one or more migration determination modules 826, and one or more migration modules 828. Any of the components depicted as being stored in data storage 818 may include any combination of software, firmware, and/or hardware. The software and/or firmware may include computer-executable instructions (e.g., computer-executable program code) that may be loaded into the memory 810 for execution by one or more of the processor(s) 808 to perform any of the operations described earlier in connection with such modules.

Although not depicted in FIG. 8, the data storage 818 may further store various types of data utilized by components of the cloud computer 802 (e.g., data stored in the datastore(s) 830). Any data stored in the data storage 818 may be loaded into the memory 810 for use by the processor(s) 808 in executing computer-executable instructions. In addition, any data stored in the data storage 818 may potentially be stored in the external datastore(s) 830 and may be accessed via the DBMS 822 and loaded in the memory 810 for use by the processor(s) 808 in executing computer-executable instructions.

The processor(s) 808 may be configured to access the memory 810 and execute computer-executable instructions loaded therein. For example, the processor(s) 808 may be configured to execute computer-executable instructions of the various program modules, applications, engines, managers, or the like of the cloud computer 802 to cause or facilitate various operations to be performed in accordance with one or more embodiments of the disclosure. The processor(s) 808 may include any suitable processing unit capable of accepting data as input, processing the input data in accordance with stored computer-executable instructions, and generating output data. The processor(s) 808 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 808 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 808 may be capable of supporting any of a variety of instruction sets.

Referring now to other illustrative components depicted as being stored in the data storage 818, the O/S 820 may be loaded from the data storage 818 into the memory 810 and may provide an interface between other application software executing on the cloud computer 802 and hardware resources of the cloud computer 802. More specifically, the O/S 820 may include a set of computer-executable instructions for managing hardware resources of the cloud computer 802 and for providing common services to other application programs. In certain example embodiments, the O/S 820 may include or otherwise control the execution of one or more of the program modules, engines, managers, or the like depicted as being stored in the data storage 818. The O/S 820 may include any operating system now known or which may be developed in the future including, but not limited to, any server operating system, any mainframe operating system, or any other proprietary or non-proprietary operating system.

The DBMS 822 may be loaded into the memory 810 and may support functionality for accessing, retrieving, storing, and/or manipulating data stored in the memory 810, data stored in the data storage 818, and/or data stored in external datastore(s) 830. The DBMS 822 may use any of a variety of database models (e.g., relational model, object model, etc.) and may support any of a variety of query languages. The DBMS 822 may access data represented in one or more data schemas and stored in any suitable data repository. Data stored in the datastore(s) 830 may include, for example, data received as part of a real-time or non-real-time data flow; raw input data; classified input data; network characteristic/parameter data; and so forth. External datastore(s) 830 that may be accessible by the cloud computer 802 via the DBMS 822 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the cloud computer 802, the input/output (I/O) interface(s) 812 may facilitate the receipt of input information by the cloud computer 802 from one or more I/O devices as well as the output of information from the cloud computer 802 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the cloud computer 802 or may be separate. The I/O devices may further include, for example, any number of peripheral devices such as data storage devices, printing devices, and so forth.

The I/O interface(s) 812 may also include an interface for an external peripheral device connection such as universal serial bus (USB), FireWire, Thunderbolt, Ethernet port or other connection protocol that may connect to one or more networks. The I/O interface(s) 812 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The cloud computer 802 may further include one or more network interfaces 814 via which the cloud computer 802 may communicate with any of a variety of other systems, platforms, networks, devices, and so forth. The network interface(s) 814 may enable communication, for example, with the network edge device 804 via one or more of the network(s) 806.

It should be appreciated that the program modules depicted in FIG. 8 as being stored in the data storage 818 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the cloud computer 802 and/or other computing devices accessible via one or more networks, may be provided to support functionality provided by the modules depicted in FIG. 8 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 8 may be implemented, at least partially, in hardware and/or firmware across any number of devices.

It should further be appreciated that the cloud computer 802 may include alternate and/or additional hardware, software, or firmware components beyond those described or depicted without departing from the scope of the disclosure. More particularly, it should be appreciated that software, firmware, or hardware components depicted as forming part of the cloud computer 802 are merely illustrative and that some components may not be present or additional components may be provided in various embodiments. While various illustrative modules have been depicted and described as software modules stored in data storage 818, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 700 may be performed by one or more cloud computers 802 having the illustrative configuration depicted in FIG. 8, or more specifically, by one or more program modules, engines, applications, or the like executable on such device(s). In example embodiments, the method 700 may be performed in a distributed fashion between the cloud computer(s) 802 and the network edge device(s) 804. It should be appreciated, however, that such operations may be implemented in connection with numerous other device/server/system configurations.

The operations described and depicted in the illustrative method of FIG. 7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for cloud-to-edge data flow migration, comprising:
   receiving input data;
   classifying the input data based at least in part on one or more classification criteria to obtain classified input data;
   determining a first portion of cloud-based data processing functionality to migrate from a cloud environment that includes one or more cloud computers to a network edge that includes one or more devices along a network path based at least in part on at least one of: i) the classified input data, ii) one or more network characteristics or iii) one or more device characteristics in the cloud environment or along the network path;
   migrating, in a container, the first portion of the cloud-based data processing functionality from the one or more cloud computers to the network edge to obtain migrated data processing functionality at the network edge; and
   processing, by the container, at the network edge, at least a subset of the input data using the migrated data processing functionality,
   wherein migrating the first portion of the cloud-based data processing functionality from the one or more cloud computers to the network edge to obtain migrated data processing functionality at the network edge comprises migrating a first function of the first portion of the cloud-based data processing functionality to a first edge device at the network edge to obtain first migrated data processing functionality and migrating, based at least in part on a dependency relationship with the first function, a second function of the first portion of the cloud-based data processing functionality to a second edge device at the network edge to obtain second migrated data processing functionality, and
   wherein processing, at the network edge, the at least a subset of the input data using the migrated data processing functionality comprises:
   processing a first subset of the input data at the first edge device using the first migrated data processing functionality to obtain first processed input data;
   providing the first processed input data as input to the second edge device; and processing the first processed input data at the second edge device using the second migrated data processing functionality to obtain second processed input data.

2. The method of claim 1, wherein classifying the input data comprises determining that an amount of the input data exceeds a threshold value, the method further comprising:
   selecting the at least a subset of the input data for processing using the migrated data processing functionality responsive, at least in part, to determining that the amount of the input data exceeds the threshold value; and
   sending the processed at least a subset of the input data to at least one of the one or more cloud computers for additional processing using a second portion of the cloud-based data processing functionality.

3. The method of claim 1, further comprising:
   determining that a network latency exceeds a threshold latency;
   selecting the at least a subset of the input data for processing using the migrated data processing functionality responsive, at least in part, to determining that the network latency exceeds the threshold latency; and
   sending the processed at least a subset of the input data to at least one of the one or more cloud computers for additional processing using a second portion of the cloud-based data processing functionality.

4. The method of claim 1, wherein the at least a subset of the input data is a first subset of the input data, the method further comprising:
   sending a second subset of the input data to at least one of the one or more cloud computers; and processing, at the at least one cloud computer, the second subset of the input data using functionality that is equivalent to the migrated data processing functionality.

5. The method of claim 4, further comprising partitioning the input data into the first subset and the second subset to achieve load balancing between processing performed at the one or more cloud computers and processing performed at the network edge.

6. The method of claim 1, wherein the migrated data processing functionality is first migrated data processing functionality and the at least a subset of the input data is a first subset, the method further comprising:
   determining a second portion of the cloud-based data processing functionality to migrate from the one or more cloud computers to the network edge;
   migrating the second portion of the cloud-based data processing functionality from the one or more cloud computers to the network edge to obtain second migrated data processing functionality at the network edge; and
   processing, at the network edge, a second subset of the input data as part of a non-real-time data flow using the second migrated data processing functionality,
   wherein the first subset of the input data is processed as part of a real-time data flow using the first migrated data processing functionality.

7. The method of claim 6, wherein processing the first subset of the input data as part of the real-time data flow comprises filtering the first subset of the input data to determine data that has changed from previously received input data, the method further comprising:
   sending, as part of the real-time data flow, the changed data and an indication of data that has not changed from the previously received input data to at least one of the one or more cloud computers for additional processing using a third portion of the cloud-based data processing functionality, wherein the at least one of the one or more cloud computers is configured to reconstruct the data that has not changed based at least in part on the indication.

8. The method of claim 1, wherein the at least a subset of the input data is a first subset of the input data, the method further comprising:
   generating, at the network edge, a new function not included in the cloud-based data processing functionality; and
   processing, at the network edge, a second subset of the input data using the new function.

9. A system for cloud-to-edge data flow migration, comprising:
   one or more network edge devices residing at a network edge along a network path;
   one or more cloud computers residing at a cloud environment;
   at least one memory storing computer-executable instructions; and
   at least one processor, wherein the at least one processor is configured to access the at least one memory and execute the computer-executable instructions to:
      receive input data;
      classify the input data based at least in part on one or more classification criteria to obtain classified input data;
      determine a first portion of cloud-based data processing functionality to migrate from the one or more cloud computers to the network edge based at least in part on at least one of: i) the classified input data, ii) one or more network characteristics, or iii) one or more device characteristics in the cloud environment or along the network path;
      migrate, in a container, the first portion of the cloud-based data processing functionality from the one or more cloud computers to the network edge to obtain migrated data processing functionality at the network edge; and
      process, by the container, at a first at least one network edge device, at least a subset of the input data using the migrated data processing functionality,
   wherein migrating the first portion of the cloud-based data processing functionality from the one or more cloud computers to the network edge to obtain migrated data processing functionality at the network edge comprises migrating a first function of the first portion of the cloud-based data processing functionality to a first edge device at the network edge to obtain first migrated data processing functionality and migrating, based at least in part on a dependency relationship with the first function, a second function of the first portion of the cloud-based data processing functionality to a second edge device at the network edge to obtain second migrated data processing functionality, and
   wherein processing, at the network edge, the at least a subset of the input data using the migrated data processing functionality comprises:
   processing a first subset of the input data at the first edge device using the first migrated data processing functionality to obtain first processed input data;
   providing the first processed input data as input to the second edge device; and processing the first processed input data at the second edge device using the second migrated data processing functionality to obtain second processed input data.

10. The system of claim 9, wherein the at least one processor is configured to classify the input data by executing the computer-executable instructions to determine that an amount of the input data exceeds a threshold value, and wherein the at least one processor is further configured to execute the computer-executable instructions to:
   select the at least a subset of the input data for processing using the migrated data processing functionality responsive, at least in part, to determining that the amount of the input data exceeds the threshold value; and
   send the processed at least a subset of the input data to at least one of the one or more cloud computers for additional processing using a second portion of the cloud-based data processing functionality.

11. The system of claim 9, wherein the at least one processor is further configured to execute the computer-executable instructions to:
   determine that a network latency exceeds a threshold latency;
   select the at least a subset of the input data for processing using the migrated data processing functionality responsive, at least in part, to determining that the network latency exceeds the threshold latency; and
   send the processed at least a subset of the input data to at least one of the one or more cloud computers for additional processing using a second portion of the cloud-based data processing functionality.

12. The system of claim 9, wherein the at least a subset of the input data is a first subset of the input data, and wherein the at least one processor is further configured to execute the computer-executable instructions to:
- send a second subset of the input data to at least one of the one or more cloud computers; and
- process, at the at least one cloud computer, the second subset of the input data using functionality that is equivalent to the migrated data processing functionality.

13. The system of claim 12, wherein the at least one processor is further configured to execute the computer-executable instructions to partition the input data into the first subset and the second subset to achieve load balancing between processing performed at the one or more cloud computers and processing performed at the network edge.

14. The system of claim 9, wherein the migrated data processing functionality is first migrated data processing functionality and the at least a subset of the input data is a first subset, and wherein the at least one processor is further configured to execute the computer-executable instructions to:
- determine a second portion of the cloud-based data processing functionality to migrate from the one or more cloud computers to the network edge;
- migrate the second portion of the cloud-based data processing functionality from the one or more cloud computers to the network edge to obtain second migrated data processing functionality at the network edge; and
- process, at a second at least one network edge device, a second subset of the input data as part of a non-real-time data flow using the second migrated data processing functionality,
- wherein the first subset of the input data is processed as part of a real-time data flow using the first migrated data processing functionality.

15. The system of claim 14, wherein at least one processor is configured to process the first subset of the input data as part of the real-time data flow by executing the computer-executable instructions to filter the first subset of the input data to determine data that has changed from previously received input data, and wherein the at least one processor is further configured to execute the computer-executable instructions to:
- send, as part of the real-time data flow, the changed data and an indication of data that has not changed from the previously received input data to the one or more cloud computers for additional processing using a third portion of the cloud-based data processing functionality, wherein the one or more cloud computers are configured to reconstruct the data that has not changed based at least in part on the indication.

16. The system of claim 9, wherein the at least a subset of the input data is a first subset of the input data, and wherein the at least one processor is further configured to execute the computer-executable instructions to:
- generate, at the network edge, a new function not included in the cloud-based data processing functionality; and
- process, at the network edge, a second subset of the input data using the new function.

17. A computer program product for cloud-to-edge data flow migration, the computer program product comprising a non-transitory storage medium readable by a processing circuit, the storage medium storing instructions executable by the processing circuit to cause a method to be performed, the method comprising:
- receiving input data;
- classifying the input data based at least in part on one or more classification criteria to obtain classified input data;
- determining a first portion of cloud-based data processing functionality to migrate from a cloud environment that includes one or more cloud computers to a network edge that includes one or more devices along a network path based at least in part on at least one of: i) the classified input data, ii) one or more network characteristics or iii) one or more device characteristics in the cloud environment or along the network path;
- migrating, in a container, the first portion of the cloud-based data processing functionality from the one or more cloud computers to the network edge to obtain migrated data processing functionality at the network edge; and
- processing, by the container, at the network edge, at least a subset of the input data using the migrated data processing functionality,
- wherein migrating the first portion of the cloud-based data processing functionality from the one or more cloud computers to the network edge to obtain migrated data processing functionality at the network edge comprises migrating a first function of the first portion of the cloud-based data processing functionality to a first edge device at the network edge to obtain first migrated data processing functionality and migrating, based at least in part on a dependency relationship with the first function, a second function of the first portion of the cloud-based data processing functionality to a second edge device at the network edge to obtain second migrated data processing functionality, and
- wherein processing, at the network edge, the at least a subset of the input data using the migrated data processing functionality comprises:
- processing a first subset of the input data at the first edge device using the first migrated data processing functionality to obtain first processed input data;
- providing the first processed input data as input to the second edge device; and processing the first processed input data at the second edge device using the second migrated data processing functionality to obtain second processed input data.

18. The computer program product of claim 14, wherein the migrated data processing functionality is first migrated data processing functionality and the at least a subset of the input data is a first subset, the method further comprising:
- determining a second portion of the cloud-based data processing functionality to migrate from the one or more cloud computers to the network edge;
- migrating the second portion of the cloud-based data processing functionality from the one or more cloud computers to the network edge to obtain second migrated data processing functionality at the network edge; and
- processing, at the network edge, a second subset of the input data as part of a non-real-time data flow using the second migrated data processing functionality,
- wherein the first subset of the input data is processed as part of a real-time data flow using the first migrated data processing functionality.

* * * * *